J. W. BAILEY.
FRAME FOR MIRRORS AND THE LIKE.
APPLICATION FILED NOV. 22, 1911.

1,039,881.

Patented Oct. 1, 1912.

WITNESSES:
F. C. Matheny
Horace Barnes

INVENTOR
John W. Bailey
BY
Dune Barnes
ATTORNEY

COLUMBIA PLANOGRAPH CO., WASHINGTON, D. C.

UNITED STATES PATENT OFFICE.

JOHN W. BAILEY, OF SEATTLE, WASHINGTON, ASSIGNOR OF ONE-HALF TO CHARLES J. YATES, OF SEATTLE, WASHINGTON.

FRAME FOR MIRRORS AND THE LIKE.

1,039,881.

Specification of Letters Patent.   Patented Oct. 1, 1912.

Application filed November 22, 1911. Serial No. 661,681.

*To all whom it may concern:*

Be it known that I, JOHN W. BAILEY, a citizen of the United States, residing at Seattle, in the county of King and State of Washington, have invented certain new and useful Improvements in Frames for Mirrors and the Like, of which the following is a specification.

This invention relates to improvements in frames for mirrors and the like.

The object of the invention is the provision of a simple mirror frame whereby an ornamental pocket mirror may be provided at an inconsiderable cost.

A further object of the invention is the provision of an inexpensive device that is particularly adapted to be utilized as a medium of advertising merchandise.

A still further object of the invention is the production of an interesting and instructive puzzle as a subsidiary means for amusing and exciting public curiosity and cause the mirror to be carried and exhibited.

The invention consists in the novel construction of a vest pocket mirror frame and the manner in which the same is assembled and the mirror secured therein, as will be hereinafter described and claimed.

Figure 1:
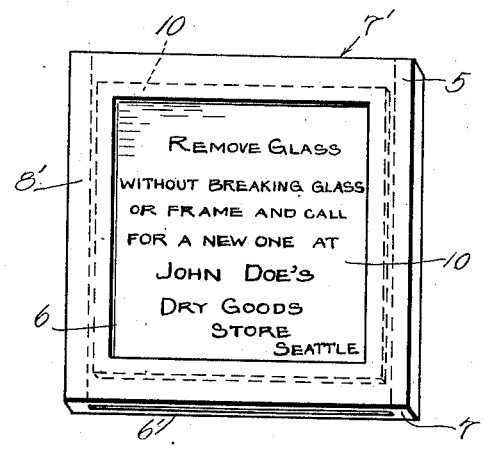
Figure 2:
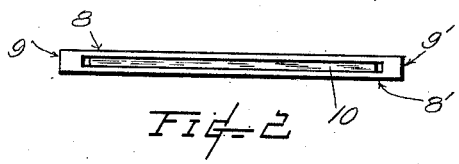
Figure 4:
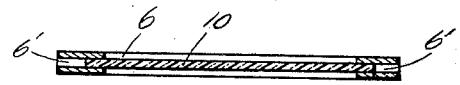
Figure 3:
Figure 5:
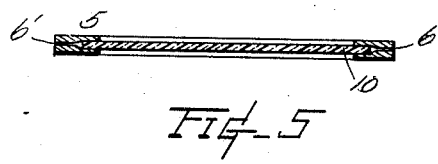

In the accompanying drawings, Figure 1 is a rear perspective view of an embodiment of the invention. Figs. 2 and 4 are, respectively, end and cross sectional views of the device before the same is compressed. Figs. 3 and 5 are end and sectional views of the completed device.

The reference numeral 5 designates the frame which is preferably as shown, of rectangular configuration although other suitable forms may be employed. Said frame is of wood preferably of a soft porous variety, as cottonwood having little utility for other uses than the present, and is integrally formed without seam or joint. Said frame is relatively thin in cross-section and is formed with a symmetrically arranged aperture 6 extending clear through the frame comprising the extent of the exposure of the contained mirror. Said aperture may obviously be of any desired configuration as round, elliptical or rectangular, whether conforming to the form of the exterior of the frame or not.

Extending into the frame from one of its lateral edges, as 7, to the opposite edge 7' is a saw cut or kerf 6' in the same plane as the upper and lower surfaces 8, 8', respectively, and intermediate the same. Said kerf extends longitudinally toward the respective ends 9, 9' of the frame somewhat beyond the extremities of said aperture 6. The depth and length of said kerf is approximately the same as the thickness and length of a glass mirror 10 which is adapted to be inserted therein while the width of said glass is somewhat greater than the width of the aperture 6.

The glass is inserted in the kerf from one of its sides and positioned symmetrically therein with respect to the aperture 6; the frame is then placed beneath a press and subjected to pressure evenly over the entire surface 8 of the frame sufficient to compress the wood composing the frame and embed the mirror in the wood firmly fixing the latter therein. At the same time, the kerf at each side of the mirror is wholly or partially closed by said pressure and leaves but slight evidence of its existence or the means through which the glass was inserted.

The resultant article is pleasing in appearance, useful and convenient to carry on the person. The surfaces 8 and 8' may bear suitable inscriptions of an advertising character as well as the reverse or quicksilvered side of the mirror. The latter may also bear an inscription to the effect that the glass may be removed without breaking the glass or frame and challenging the user to accomplish that trick. As the kerf, aforesaid, is considerably diminished in size if not entirely eliminated to sight and the frame does not otherwise present any appearance of access to the glass otherwise than the aperture 6 it presents an interesting problem.

The removal of the mirror can be accomplished by dipping the frame in water whereupon the wood will swell to its normal size and the glass may be removed through the kerf which opens to its original dimensions. The utility of the device as a pocket mirror may be diminished by the operation of removing the mirror but the articles are cheap and can be readily replaced. An inscription on the reverse of the mirror may direct the person solving the means to remove the glass where to procure a new one.

What I claim as my invention and desire to secure by Letters Patent is—

A frame for mirrors and the like formed of wood having a central opening therein, a kerf extending through said frame, a mirror or the like placed in said frame and retained therein by the compressed open ends of said frame.

JOHN W. BAILEY.

Witnesses:
  HORACE BARNES,
  E. PETERSON.

Copies of this patent may be obtained for five cents each, by addressing the "Commissioner of Patents, Washington, D. C."